(12) United States Patent
Koyama

(10) Patent No.: US 10,321,106 B2
(45) Date of Patent: Jun. 11, 2019

(54) POSITION DETECTION APPARATUS AND CONTRAST ADJUSTMENT METHOD USED WITH THE SAME

(71) Applicant: Seiko Epson Corporation, Tokyo (JP)

(72) Inventor: Takaaki Koyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 15/425,792

(22) Filed: Feb. 6, 2017

(65) Prior Publication Data

US 2017/0237955 A1   Aug. 17, 2017

(30) Foreign Application Priority Data

Feb. 17, 2016   (JP) .................................. 2016-027490

(51) Int. Cl.
*H04N 9/31* (2006.01)
*G06T 7/70* (2017.01)
*G06F 3/00* (2006.01)

(52) U.S. Cl.
CPC ............. *H04N 9/3188* (2013.01); *G06F 3/00* (2013.01); *G06T 7/70* (2017.01); *H04N 9/3194* (2013.01); *G06T 2207/10016* (2013.01); *G06T 2207/10152* (2013.01)

(58) Field of Classification Search
CPC ....................................................... G06T 7/70
See application file for complete search history.

(56) References Cited

U.S. PATENT DOCUMENTS

| 6,269,565 | B1* | 8/2001 | Inbar .................... G02B 27/024 345/87 |
| 7,034,807 | B2* | 4/2006 | Maggioni ............. G06F 3/0428 345/156 |
| 7,777,722 | B2* | 8/2010 | Bohn .................... G06F 3/0317 345/156 |
| 8,913,253 | B2 | 12/2014 | Kiyose |
| 2005/0178953 | A1* | 8/2005 | Worthington ......... G06F 3/0421 250/221 |
| 2013/0169796 | A1* | 7/2013 | Van Der Burgt .. H05B 33/0866 348/135 |

FOREIGN PATENT DOCUMENTS

| JP | 2012-037264 A | 2/2012 |
| JP | 2012-150636 A | 8/2012 |

* cited by examiner

*Primary Examiner* — Michael E Teitelbaum
(74) *Attorney, Agent, or Firm* — ALG Intellectual Property, LLC

(57) ABSTRACT

A position detection apparatus includes a first irradiation section and a second irradiation section that irradiate an operation surface with detection light, an imaging section that captures an image of the operation surface, and a detection section that detects a pointed position pointed with a pointing element based on the captured image. The first irradiation section is disposed in a position closer to the operation surface than the second irradiation section and emits light having intensity higher than the intensity of the light emitted from the second irradiation section. Instead, the position detection apparatus further includes an adjustment section that adjusts the intensity of the light emitted from at least one of the first irradiation section and the second irradiation section to adjust contrast between the pointing element and the operation surface to a value that exceeds a threshold.

10 Claims, 6 Drawing Sheets

POSITION DETECTION APPARATUS AND CONTRAST ADJUSTMENT METHOD USED WITH THE SAME

The entire disclosure of Japanese Patent Application No. 2016-027490, filed Feb. 17, 2016 is expressly incorporated by reference herein.

BACKGROUND

1. Technical Field

The present invention relates to a position detection apparatus capable of detecting the position pointed with a pointing element on an operation surface.

2. Related Art

JP-A-2012-150636 discloses an interactive projector having the function as a position detection apparatus. The interactive projector can project a projected screen on a screen, capture an image containing a pointing element, such as a light emitting pen and a finger, with a camera, and detect the position pointed with the pointing element by using the captured image. That is, when the front end of an object is in contact with the screen, the interactive projector recognizes that a predetermined instruction, such as a drawing instruction, is inputted to the projected screen and draws the projected screen again in accordance with the instruction. A user can therefore input a variety of instructions by using the projected screen as a user interface.

To detect the position pointed with the pointing element, the interactive projector irradiates the pointing element with detection light, such as infrared light, and captures an image of the detection light reflected off the pointing element with the camera. To detect the position pointed with the pointing element on the basis of the captured image, contrast between the pointing element and the projected screen is used to determine the position of the pointing element in the image. To this end, the image captured with the camera desirably provides sufficient contrast between the pointing element and the projected screen.

The inventor of the present application, however, has found that it is not always easy to sufficiently increase the contrast between the pointing element and the projected screen, and that sufficient contrast cannot be provided depending on the detection light irradiation state. The problem is not limited to an interactive projector but is a common problem in a position detection apparatus that detects a pointed position pointed with a pointing element on an operation surface.

SUMMARY

An advantage of some aspects of the invention is to solve at least a part of the problems described above, and the invention can be implemented as the following forms or application examples.

(1) According to an aspect of the invention, a position detection apparatus that detects a pointed position pointed with a pointing element on an operation surface is provided. The position detection apparatus includes a first irradiation section and a second irradiation section that irradiate the operation surface with detection light, an imaging section that captures an image of the operation surface, and a detection section that detects the pointed position pointed with the pointing element based on the captured image captured by the imaging section. The first irradiation section is disposed in a position closer to the operation surface than the second irradiation section and emits light having intensity higher than intensity of the light emitted from the second irradiation section.

According to the position detection apparatus, since the intensity of the light emitted from the first irradiation section, which is closer to the operation surface, is higher than the intensity of the light emitted from the second irradiation section, sufficient contrast can be obtained, whereby the position pointed with the pointing element can be determined on the basis of the captured image.

(2) A position detection apparatus according to another aspect of the invention includes a first irradiation section and a second irradiation section that irradiate the operation surface with detection light, an imaging section that captures an image of the operation surface, a detection section that detects the pointed position pointed with the pointing element based on the captured image captured by the imaging section, and an adjustment section that adjusts intensity of the light emitted from at least one of the first irradiation section and the second irradiation section to adjust contrast between the pointing element and the operation surface in the captured image to a value that exceeds a threshold.

According to the position detection apparatus, since the adjustment section can adjust the intensity of the light emitted from each of the first irradiation section and the second irradiation section to obtain sufficient contrast, the position pointed with the pointing element can be determined on the basis of the captured image.

(3) The position detection apparatus described above may further include a use environment acquiring section that acquires an environment in which the position detection apparatus is used, and the adjustment section may adjust the light emission intensity in accordance with the environment in which the position detection apparatus is used.

The configuration described above, in which the light emission intensity is adjusted in accordance with the environment in which the position detection apparatus is used, allows sufficient contrast to be obtained.

(4) In the position detection apparatus described above, the use environment may include at least one of posture of the installed position detection apparatus, a distance between the position detection apparatus and the operation surface, and brightness of the operation surface under environmental light.

The configuration described above, in which the light emission intensity is adjusted in accordance with the posture of the installed position detection apparatus, the distance between the imaging section and the operation surface, the brightness of the operation surface under environmental light, or any other use environment, allows sufficient contrast to be obtained.

(5) In the position detection apparatus described above, the first irradiation section may be disposed in a position closer to the operation surface than the second irradiation section, and the adjustment section may adjust the intensity of the light emitted from the first irradiation section to a value higher than the intensity of the light emitted from the second irradiation section.

The configuration described above, in which the intensity of the light emitted from the first irradiation section, which is closer to the operation surface, is increased, allows excellent contrast to be obtained.

(6) In the position detection apparatus described above, the first irradiation section and the second irradiation section may emit the detection section in a time division manner, and the imaging section may perform the imaging in each of a period for which the first irradiation section emits light and a period for which the second irradiation section emits light.

According to the configuration described above, even in a case where there are areas where the contrast values obtained by using the first irradiation section and the second irradiation section are reversed in terms of sign of the contrast, positive or negative, the first and second irradiation sections emit light in a time division manner. Sufficient contrast can therefore be obtained by use of captured images captured in the light emission periods.

(7) In the position detection apparatus described above, the intensity of the light emitted from each of the first irradiation section and the second irradiation section may be so adjusted that a sum of a first area where first contrast obtained when the first irradiation section emits light exceeds a threshold and a second area where second contrast obtained when the second irradiation section emits light exceeds another threshold encompasses an entire area of the operation surface.

According to the configuration described above, the pointing element can be clearly identified over the entire area of the operation surface.

The invention can be implemented in a variety of forms. For example, the invention can be implemented in a position detection apparatus, a position detection system including a self-luminous pointing element and the position detection apparatus, a position detection method, a computer program for achieving the method or the function of the apparatus, a non-transitory storage medium on which the computer program is stored, and a variety of other forms.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
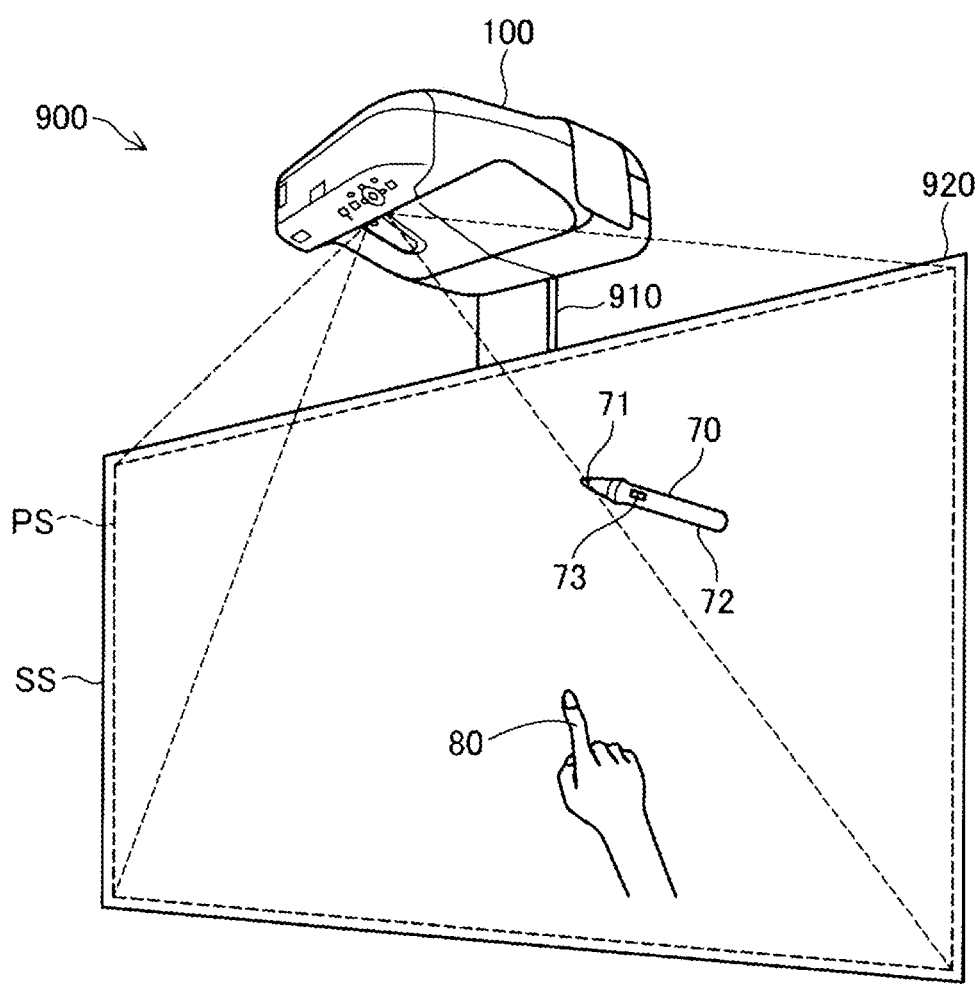
FIG. 1 is a perspective view of a position detection system.

FIG. 1 is a perspective view of a position detection system 900 as an embodiment of the invention. The system 900 includes an interactive projector 100, which serves as a position detection apparatus, a screen plate 920, which provides an operation surface, and a self-luminous pointing element 70. The front surface of the screen plate 920 is used as a projection screen surface SS. The projector 100 is fixed in front of and above the screen plate 920 by a supporting member 910. In FIG. 1, the projection screen surface SS is vertically disposed. Instead, the system 900 can be used with the projection screen surface SS horizontally disposed.

The projector 100 projects a projected screen PS on the projection screen surface SS. The projected screen PS typically contains an image drawn in the projector 100. In a case where no image is drawn in the projector 100, the projected screen PS is so irradiated with light from the projector 100 that a white image is displayed. In the present specification, the term "projection screen surface SS" means a surface of a member on which an image is projected. Further, the term "projected screen PS" means the area of an image projected on the projection screen surface SS by the projector 100. In general, the projected screen PS is projected on part of the projection screen surface SS. The projection screen surface SS is also used as an operation surface where a position is pointed with the pointing element and is therefore also called an "operation surface SS."

The self-luminous pointing element 70 is a pen-shaped pointing element formed of a front end section 71, which can emit light, a shaft section 72, which is held by a user, and a button switch 73, which is provided on the shaft 72. The front end section 71 of the self-luminous pointing element 70 emits, for example, near infrared light. The configuration and function of the self-luminous pointing element 70 will be described later. In the system 900, one or more non-luminous pointing elements 80 (such as non-luminous pen and finger) can be used with one or more self-luminous pointing elements 70.

Figure 2A:
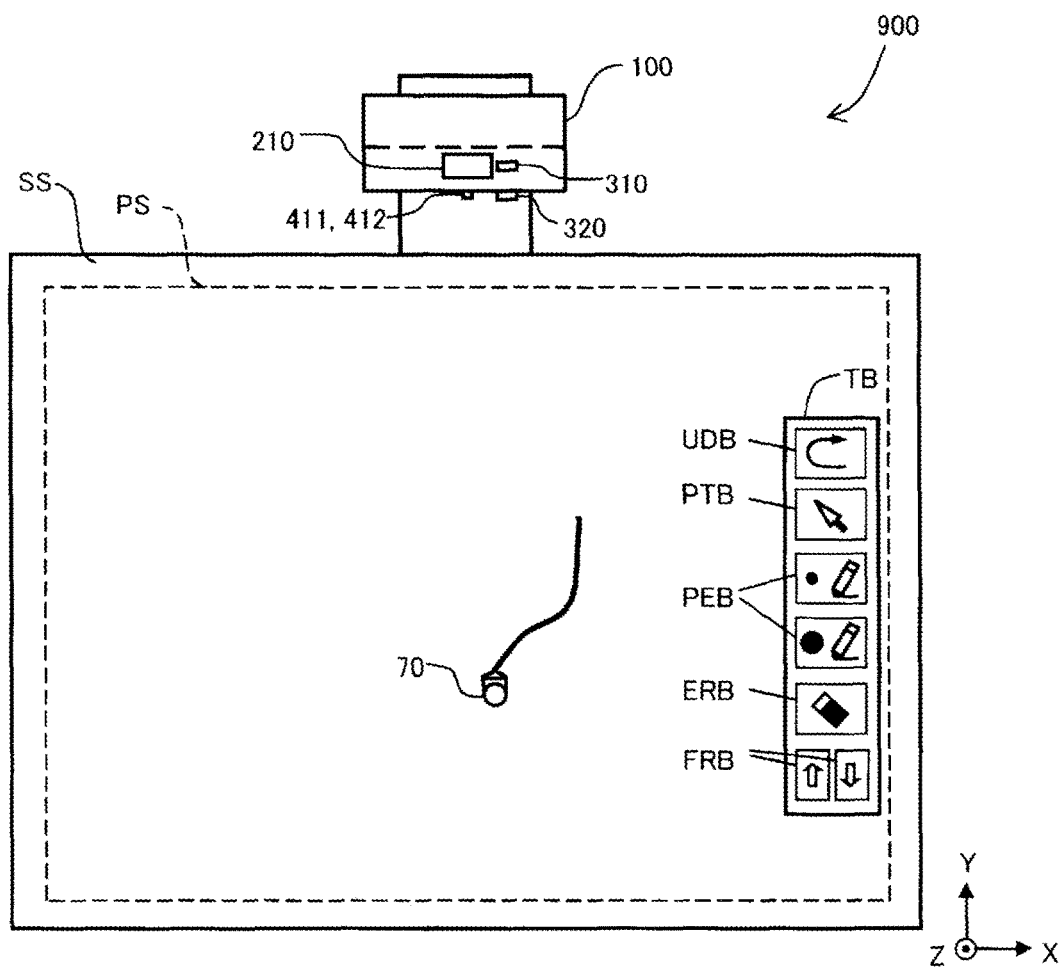
FIG. 2A is a front view of the position detection system.
Figure 2B:
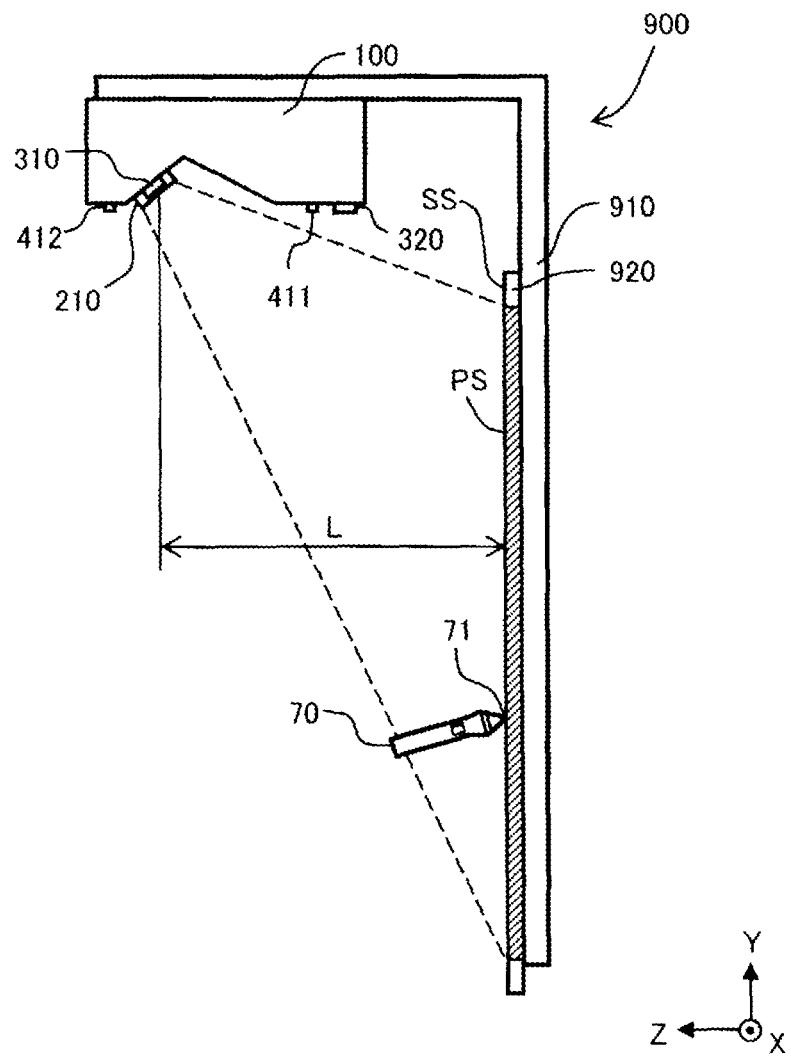
FIG. 2B is a side view of the position detection system.

FIG. 2A is a front view of the position detection system 900, and FIG. 2B a side view thereof. In the present specification, X, Y and Z directions are defined as follows: the X direction is the rightward/leftward direction of the operation surface SS; the Y direction is the upward/downward direction of the operation surface SS; and the Z direction is the direction along a normal to the operation surface SS. The lower left position of the operation surface SS in FIG. 2A is set to be the origin (0, 0) of the coordinate system (X, Y). The X direction is also called the "rightward/leftward direction," the Y direction is also called the "upward/downward direction," and the Z direction is also called a "frontward/rearward direction" for convenience. Out of the two directions that form the Y direction (upward/downward direction), the direction along which the projected screen PS exists when viewed from the projector 100 is called the "downward direction." In FIG. 2B, part of the screen plate 920 or the range of the projected screen PS is hatched for ease of illustration.

The projector 100 includes a projection lens 210, which projects the projected screen PS on the operation surface SS, a first camera 310 and a second camera 320, each of which captures an image of the area of the projected screen PS, and two irradiation sections 411 and 412, each of which illuminates the pointing elements (self-luminous pointing element 70 and non-luminous pointing element 80) with detection light. Near infrared light is, for example, used as the detection light. The two cameras 310 and 320 have at least a first imaging function of receiving and capturing light that belongs to a wavelength region containing the wavelength of the detection light. At least one of the two cameras 310 and 320 is preferably configured to further have a second imaging function of receiving and capturing light containing visible light and to be capable of switching one of the two imaging functions to the other. For example, the two cameras 310 and 320 preferably each include a near infrared filter switching mechanism (not shown) capable of placing a near infrared filter, which blocks visible light but transmits only near infrared light, in front of a lens and removing the filter from the position in front of the lens. The camera 310 is disposed in a position separate from the operation surface SS in the Z direction by a distance L, as shown in FIG. 2B.

The example in FIG. 2A shows that the position detection system 900 operates in a whiteboard mode. The whiteboard mode is a mode in which the user can arbitrarily perform drawing on the projected screen PS by using the self-luminous pointing element 70 or the non-luminous pointing element 80. The projected screen PS projected on the operation surface SS contains a tool box TB. The tool box TB contains an undo button UDB, which undoes the process having just been carried out, a pointer button PTB, which allows the user to select a mouse pointer, pen buttons PEB, which allow the user to select a drawing pen tool, an eraser button ERB, which allows the user to select an eraser tool that erases a drawn image, and frontward/backward buttons FRB, which bring the screen back and forth. The user can use a pointing element to click any of the buttons to carry out a process corresponding to the button or select any of the tools. It is noted that immediately after the system 900 is activated, the mouse pointer may be selected as a default tool. The example in FIG. 2A shows that the user selects the pen tool and then moves the front end section 71 of the self-luminous pointing element 70 within the projected screen PS with the front end section 71 being in contact with the operation surface SS to draw a line on the projected screen PS. The line is drawn by a projected image generating section (which will be described later) in the projector 100.

The position detection system 900 can operate in a mode other than the whiteboard mode. For example, the system 900 can operate in a PC interactive mode, in which an image of data forwarded from a personal computer (not shown) over a communication network is displayed on the projected screen PS. In the PC interactive mode, an image of data, for example, spreadsheet software, is displayed, and the user can use a variety of tools and icons displayed in the image to input, create, correct, and otherwise process the data.

Figure 3:
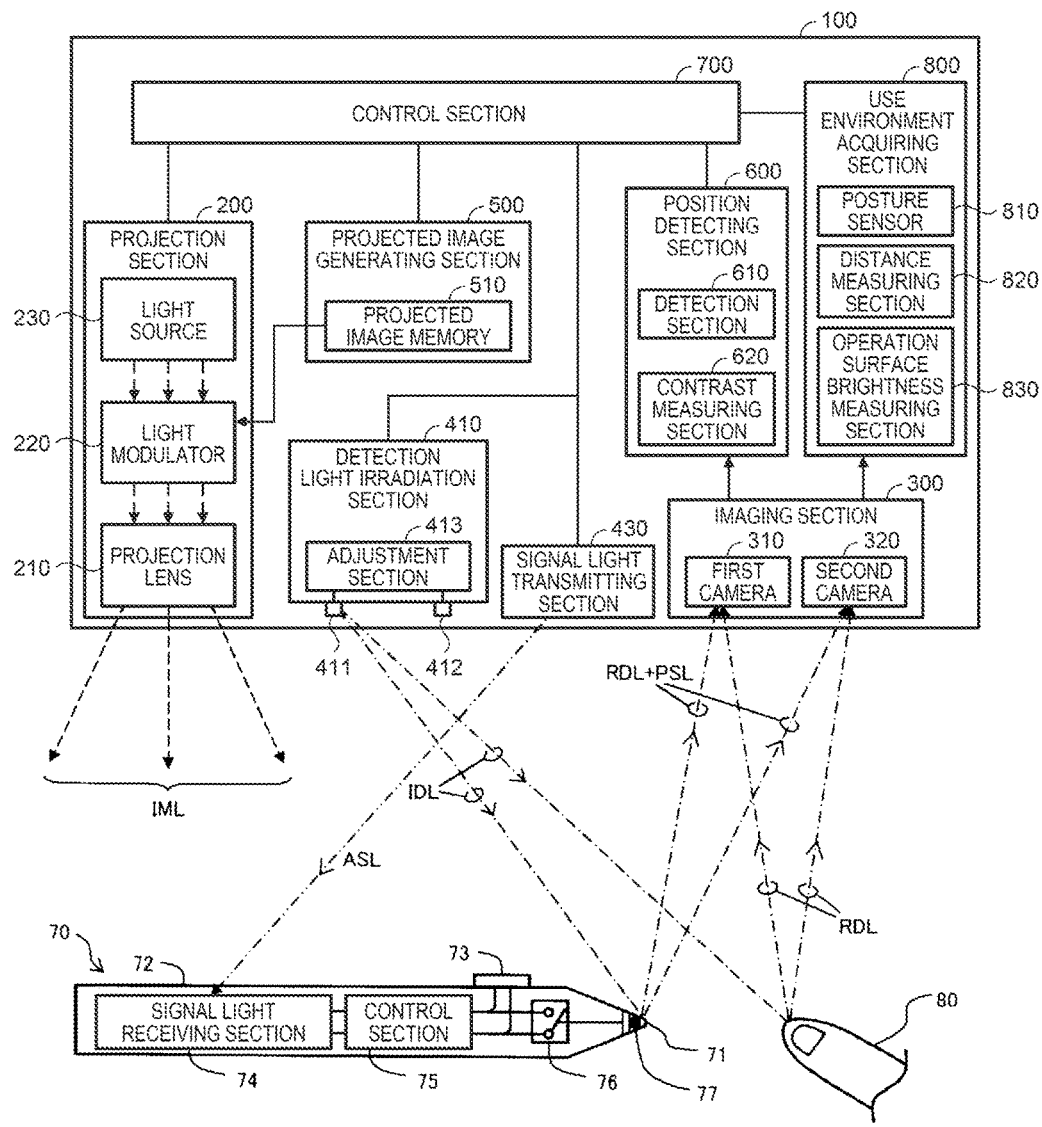
FIG. 3 is a block diagram showing the internal configuration of a projector.

FIG. 3 is a block diagram showing the internal configuration of the interactive projector 100 and the self-luminous pointing element 70. The projector 100 includes a control section 700, a projection section 200, a projected image generating section 500, a position detecting section 600, a use environment acquiring section 800, an imaging section 300, a detection light irradiation section 410, and a signal light transmitting section 430. The detection light irradiation section 410 includes a first irradiation section 411, a second irradiation section 412, and an adjustment section 413. The use environment acquiring section 800 has the function of acquiring the environment in which the projector 100 is used and includes a posture sensor 810, a distance measuring section 820, and an operation surface brightness measuring section 830.

The control section 700 controls the sections in the projector 100. The control section 700 further determines the content of an instruction made on the projected screen PS with a pointing element (self-luminous pointing element 70 or non-luminous pointing element 80) detected by the position detecting section 600 and instructs the projected image generating section 500 to create a projected image or change the projected image in accordance with the content of the instruction.

The projected image generating section 500 includes a projected image memory 510, which stores projected images, and has the function of generating a projected image to be projected on the operation surface SS by the projection section 200. The projected image generating section 500 preferably further has the function as a keystone correction section that corrects trapezoidal distortion of the projected screen PS (FIG. 2B).

The projection section 200 has the function of projecting a projected image generated by the projected image generating section 500 on the operation surface SS. The projection section 200 includes a light modulator 220 and a light source 230 as well as the projection lens 210 described with reference to FIG. 2B. The light modulator 220 modulates light from the light source 230 in accordance with projected image data provided from the projected image memory 510 to form projected image light IML. The projected image light IML is typically color image light containing RGB three color visible light fluxes and is projected on the operation surface SS through the projection lens 210. The light source 230 can be a light source lamp, such as an ultrahigh-pressure mercury lamp or any of a variety of other light sources, such as a light emitting diode and a laser diode. The light modulator 220 can be a transmissive or reflective liquid crystal panel, a digital mirror device, or any other component and may be configured to include a plurality of light modulators 220 on a color basis.

Each of the two irradiation sections 411 and 412 irradiates the operation surface SS and a space in front thereof with emitted detection light IDL for detection of the front end section of each of the pointing elements (self-luminous pointing element 70 and non-luminous pointing element 80). Near infrared light is, for example, used as the emitted detection light IDL. The irradiation sections 411 and 412 go on only for a predetermined period including imaging timing at which the cameras 310 and 320 perform imaging and go off for the other periods. Further, in the present embodiment, the irradiation sections 411 and 412 go on in a time division manner in such a way that they emit light for different light emission periods that do not overlap with each other. The first irradiation section 411 is disposed in a position closer to the operation surface SS than the second irradiation section 412, as shown in FIG. 2B. The adjustment section 413 adjusts the intensity of the light emitted by each of the irradiation sections 411 and 412 to adjust the contrast between each of the pointing elements and the operation surface SS in the captured images to a value that falls within a preferable range. This point will be further described later.

The signal light transmitting section 430 has the function of transmitting apparatus signal light ASL to be received with the self-luminous pointing element 70. The apparatus signal light ASL is a near infrared light signal for synchronization and is regularly issued from the signal light transmitting section 430 in the projector 100 to the self-luminous pointing element 70. A front end light emitting section 77 of the self-luminous pointing element 70 emits, in synchronization with the apparatus signal light ASL, pointing element signal light PSL (which will be described later), which is near infrared light having a light emission pattern (light emission sequence) specified in advance. The cameras 310 and 320 of the imaging section 300, when they detect the positions of the pointing elements (self-luminous pointing element 70 and non-luminous pointing element 80), perform imaging at predetermined timing in synchronization with the apparatus signal light ASL.

The imaging section 300 includes the first camera 310 and the second camera 320 described with reference to FIGS. 2A and 2B. The two cameras 310 and 320 each have the function of receiving light that belongs to a wavelength region containing the wavelength of the detection light and capturing an image of the light, as described above. The example in FIG. 3 shows that the emitted detection light IDL emitted by the irradiation section 411 is reflected off the pointing elements (self-luminous pointing element 70 and non-luminous pointing element 80), and that reflected detection light RDL is received and imaged with the two cameras 310 and 320. The two cameras 310 and 320 further also each receive the pointing element signal light PSL, which is the near infrared light emitted from the front end light emitting section 77 of the self-luminous pointing element 70, and capture an image of the pointing element signal light PSL.

The two cameras 310 and 320 perform the imaging both in a first period in which the emitted detection IDL light emitted from the detection light irradiation section 410 is ON (light-emission state) and a second period in which the emitted detection light IDL is OFF (non-light-emission state). The position detecting section 600 can compare the images in the two types of period with each other to determine whether each of the pointing elements contained in the images is the self-luminous pointing element 70 or the non-luminous pointing element 80.

At least one of the two cameras 310 and 320 preferably has the function of performing imaging by using light containing visible light as well as the function of performing imaging by using light containing near infrared light. In this case, an image of the projected screen PS projected on the operation surface SS can be captured with the camera, and the projected image generating section 500 can use the image to perform keystone correction. Since a keystone correction method using one or more cameras is known, no description thereof will be made in the description.

The position detecting section 600 has the function of determining the three-dimensional position of the front end section of each of the pointing elements (self-luminous pointing element 70 and non-luminous pointing element 80) by using images captured with the two cameras 310 and 320. In this process, the position detecting section 600 further evaluates whether each of the pointing elements in the images is the self-luminous pointing element 70 or the non-luminous pointing element 80 by using the light emission pattern of the light emitted from the self-luminous pointing element 70. In the present embodiment, the position detecting section 600 includes a detection section 610 and a contrast measuring section 620. The detection section 610 has the function of analyzing the captured images captured with the cameras 310 and 320 to detect the positions pointed with the pointing elements. The contrast measuring section 620 has the function of measuring the contrast values in the images captured with the cameras 310 and 320. The thus obtained contrast values are used to adjust the intensities of the light fluxes emitted from the two irradiation sections 411 and 412 (the adjustment will be described later).

The use environment acquiring section 800 has the function of acquiring the environment in which the projector 100 is used. In the present embodiment, the following items can be used as the environment in which the projector 100 is used.
(a) Posture of installed projector 100
(b) Distance between projector 100 and operation surface SS
(c) Brightness of operation surface SS under environmental light The posture sensor 810 is a sensor for detecting the posture of the installed projector 100. The posture sensor 810 is preferably configured to be capable of detecting whether the projector 100 has a horizontal posture (operation surface SS is vertically disposed) or a vertical posture (operation surface SS is horizontally disposed). A gyro can, for example, be used as the posture sensor 810.

The distance measuring section 820 measures the distance between the projector 100 and the operation surface SS. For example, the distance measuring section 820 can measure the distance L between the camera 310 and the operation surface SS shown in FIG. 2B as a representative distance between the projector 100 and the operation surface SS. The distance L can be measured, for example, by projecting a reference pattern image prepared in advance on the operation surface SS, capturing an image of the reference pattern image with each of the two cameras 310 and 320, and using triangulation based on the captured images. The distance L can instead be measured by capturing an image of the reference pattern image with one camera 310 and performing triangulation using the captured image and the reference pattern image in the projected image memory 510. In the present embodiment, the distance L is used as the representative distance between the projector 100 and the operation surface SS, and the distance between another representative point other than the camera 310 and the operation surface SS may instead be measured.

The operation surface brightness measuring section 830 measures the brightness of the operation surface SS under environmental light. For example, the operation surface brightness measuring section 830 measures the brightness of the operation surface SS in a state in which no light from the projection section 200 or the detection light irradiation section 410 is projected on the operation surface SS (background state). The brightness of the operation surface SS can also be used to adjust the intensities of the light fluxes from the two irradiation sections 411 and 412 (the adjustment will be described later).

The self-luminous pointing element 70 is provided with a signal light receiving section 74, a control section 75, a front end switch 76, and the front end light emitting section 77 as well as the button switch 73. The signal light receiving section 74 has the function of receiving the apparatus signal light ASL emitted from the signal light transmitting section 430 in the projector 100. The front end switch 76 is a switch that is turned on when the front end section 71 of the self-luminous pointing element 70 is pressed and turned off when the front end section 71 is released. The front end switch 76 is typically in the off state and transitions to the on state due to contact pressure produced when the front end section 71 of the self-luminous pointing element 70 comes into contact with the operation surface SS. When the front end switch 76 is in the off state, the control section 75 causes the front end light emitting section 77 to emit light in a specific first light emission pattern representing that the front end switch 76 is in the off state and hence emit the pointing element signal light PSL having the first light emission pattern. On the other hand, when the front end switch 76 transitions to the on state, the control section 75 causes the front end light emitting section 77 to emit light in a specific second light emission pattern representing that the front end switch 76 is in the on state and hence emit the pointing element signal light PSL having the second light emission pattern. Since the first light emission pattern and the second light emission pattern differ from each other, the position detecting section 600 can identify whether the front end switch 76 is in the on state or in the off state by analyzing the images captured with the two cameras 310 and 320.

As described above, in the present embodiment, contact evaluation of whether or not the front end section 71 of the self-luminous pointing element 70 is in contact with the operation surface SS is performed in accordance with the on/off state of the front end switch 76. Since the three-dimensional position of the front end section 71 of the self-luminous pointing element 70 can be determined by triangulation using the images captured with the two cameras 310 and 320, the contact evaluation of whether the front end section 71 of the self-luminous pointing element 70 is in contact with the operation surface SS can also be performed by using the three-dimensional position. It is, however, noted that the accuracy of detection of the Z coordinate (coordinate in direction of normal to operation surface SS) by using triangulation is not always high in some cases. The contact evaluation is therefore preferably performed in accordance with the on/off state of the front end switch 76 from the viewpoint of more accurate contact evaluation.

The button switch 73 of the self-luminous pointing element 70 has the same function as that of the front end switch 76. The control section 75 therefore causes the front end light emitting section 77 to emit light having the second light emission pattern described above in the state in which the button switch 73 is pressed by the user and causes the front end light emitting section 77 to emit light having the first light emission pattern described above in the state in which the button switched 73 is not pressed. In other words, the control section 75 causes the front end light emitting section 77 to emit light having the second light emission pattern described above in the state in which at least one of the front end switch 76 and the button switch 73 is in the on state and causes the front end light emitting section 77 to emit light having the first light emission pattern described above in the state in which both the front end switch 76 and the button switch 73 are in the off state.

Instead, a function different from the function of the front end switch 76 may be assigned to the button switch 73. For example, in a case where the same function as that of the right click button of a mouse is assigned to the button switch 73, when the user presses the button switch 73, the instruction related to the right clicking is transmitted to the control section 700 in the projector 100, and a process according to the instruction is carried out. In the case where a function different from the function of the front end switch 76 is assigned to the button switch 73, as described above, the front end light emitting section 77 emits light having one of four light emission patterns different from one another in accordance with the on/off state of the front end switch 76 and the on/off state of the button switch 73. In this case, the self-luminous pointing element 70 can distinguish the combinations of the four on/off states of the front end switch 76 and the button switch 73 from one another and transmit an instruction according to one of the combinations to the projector 100.

Specific examples of the five types of signal light drawn in FIG. 3 are summarized as follows.

(1) Projected image light IML: The projected image light IML is image light (visible light) projected on the operation surface SS through the projection lens 210 to project the projected screen PS on the operation surface SS.

(2) Emitted detection light IDL: The emitted detection light IDL is near infrared light with which the operation surface SS and the space in front thereof are irradiated by the detection light irradiation section 410 (411, 412) for detection of the front end sections of the pointing elements (self-luminous pointing element 70 and non-luminous pointing element 80).

(3) Reflected detection light RDL: The reflected detection light RDL is near infrared light reflected off the pointing elements (self-luminous pointing element 70 and non-luminous pointing element 80) and received with the two cameras 310 and 320 out of the near infrared light emitted as the emitted detection light IDL.

(4) Apparatus signal light ASL: The apparatus signal light ASL is near infrared light regularly emitted from the signal light transmitting section 430 in the projector 100 to allow the projector 100 to synchronize with the self-luminous pointing element 70.

(5) Pointing element signal light PSL: The pointing element signal light PSL is near infrared light emitted from the front end light emitting section 77 of the self-luminous pointing element 70 at timing synchronized with the apparatus signal light ASL. The light emission pattern of the pointing element signal light PSL is changed in accordance with the on/off states of the switches 73 and 76 of the self-luminous pointing element 70. The pointing element signal light PSL also has a specific light emission pattern that allows identification among a plurality of self-luminous pointing elements 70.

Figure 4:
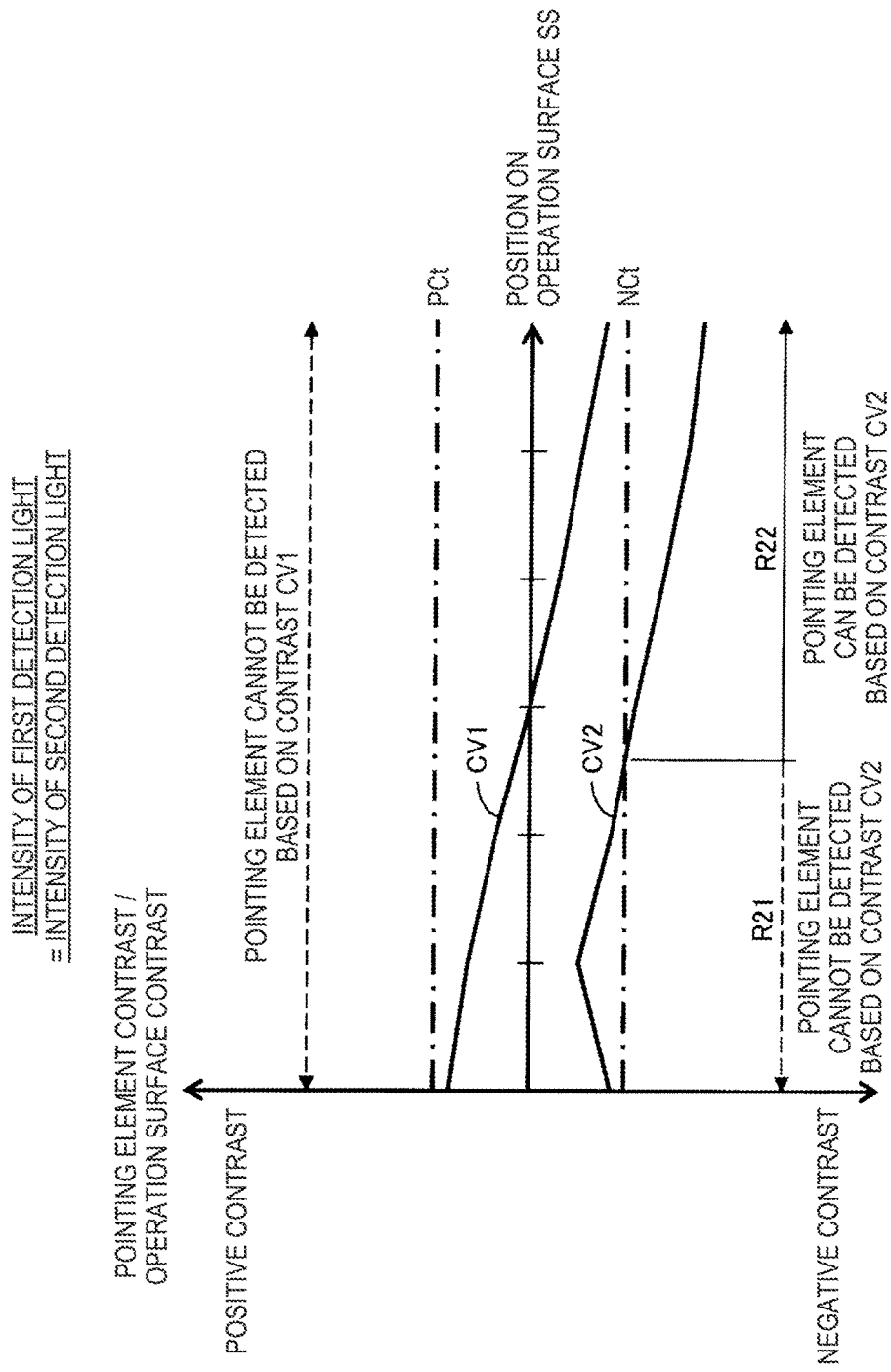
FIG. 4 is a descriptive diagram showing contrast before adjustment of the intensity of detection light.

FIG. 4 is a descriptive diagram showing an example of the contrast before the adjustment of the detection light intensities. The horizontal axis in FIG. 4 represents the position on the operation surface SS. In practice, the position on the operation surface SS is a two-dimensional position but is expressed as a one-dimensional point in FIG. 4 for ease of illustration. The vertical axis represents the value of the contrast between a pointing element (non-luminous pointing element 80, in particular) and the operation surface SS. The contrast is the ratio of the pixel value of the pointing element to the pixel value of the operation surface SS in a captured image. The contrast can, for example, be calculated as the ratio of the average of the pixel values of a pointing element to the average of the pixel values of the operation surface SS within a fixed-size area (20×20 pixels, for example) containing the front end of the pointing element. The upper half of the vertical axis corresponds to a positive contrast range, and the lower half of the vertical axis corresponds to a negative contrast range. The "positive contrast" means a state in which the pointing element is brighter than the operation surface SS in a captured image, and the "negative contrast" means a state in which the pointing element is darker than the operation surface SS in a captured image. A positive contrast threshold PCt is a threshold that allows the pointing element to be distinguished from the operation surface SS and clearly recognized when the contrast is greater than or equal to the threshold PCt. A negative contrast threshold NCt is a threshold that allows the pointing element to be distinguished from the operation surface SS and clearly recognized when the contrast is smaller than or equal to the threshold NCt.

In FIG. 4, two contrast distributions CV1 and CV2 are drawn with the solid lines. The first contrast CV1 is the contrast in a captured image captured in a state in which only the first irradiation section 411 emits light but the second irradiation section 412 emits no light. On the other hand, the second contrast CV2 is the contrast in a captured image captured in a state in which only the second irradiation section 412 emits light but the first irradiation section 411 emits no light. It is assumed in the description that the first irradiation section 411 and the second irradiation section 412 emit light of the same intensity (same detection light intensity). The contrast CV1 and the contrast CV2 are calculated by the contrast measuring section 620 by using a captured image captured with the camera 310 (or 320). The distributions of the contrast CV1 and the contrast CV2 over roughly the entire operation surface SS can be determined, for example, by performing imaging in a plurality of positions by using the camera 310 with the front end of the non-luminous pointing element 80 moved over the operation surface SS in the state in which the two irradiation sections 411 and 412 go on in a time division manner and analyzing the plurality of obtained captured images.

In this example, the first contrast CV1 falls within the range between the two thresholds PCt and NCt in every position on the operation surface SS. Therefore, in the case where the first irradiation section 411 is used, the contrast between the pointing element and the operation surface SS is insufficient, so that the detection section 610 cannot potentially clearly recognize the pointing element in a captured image. On the other hand, the second contrast CV2 falls within the range between the two thresholds PCt and NCt in an area R21, which is part of the operation surface SS, but is smaller than or equal to the negative contrast threshold NCt in the other area R22. Therefore, in the case where the second irradiation section 412 is used, in the area R22, the pointing element can be clearly recognized in a captured image, but in the area R21, the pointing element cannot potentially be recognized. The adjustment section 413 of the detection light irradiation section 410 can adjust the intensity of the detection light from at least one of the two irradiation sections 411 and 412 in accordance with results of measurement of the contrast CV1 and CV2 to adjust the contrast to a value that exceeds one of the two thresholds PCt and NCt in an arbitrary position on the operation surface SS. In the present specification, the phrase "the contrast exceeds a threshold" means that the contrast is greater than or equal to the positive contrast threshold PCt or smaller than or equal to the negative contrast threshold NCt.

Figure 5:
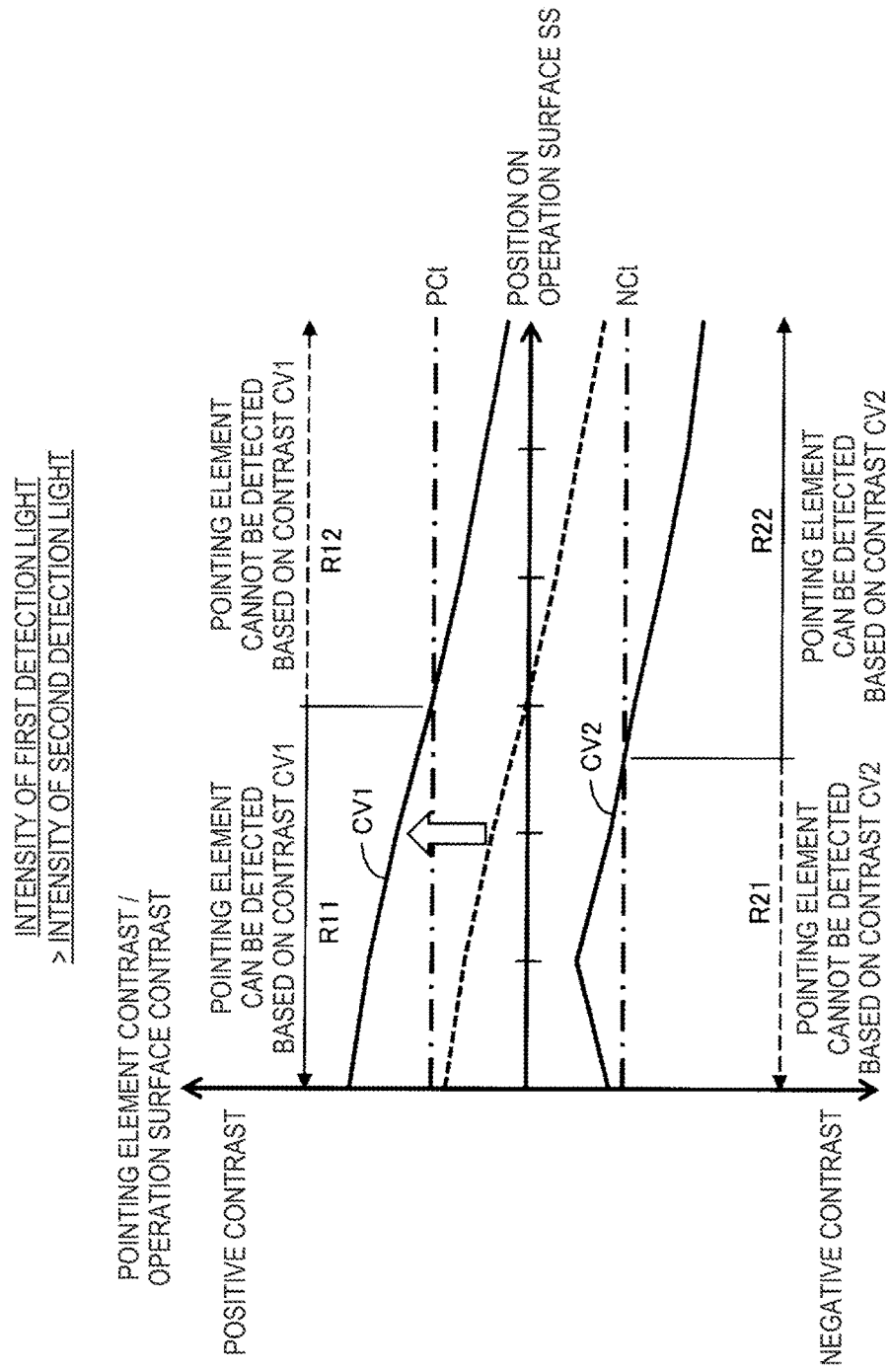
FIG. 5 is a descriptive diagram showing the contrast after adjustment of the intensity of the detection light.

FIG. 5 is a descriptive diagram showing an example of the contrast after the adjustment of the detection light intensities. In the description, the first contrast CV1 is increased as compared with the first contrast CV1 in FIG. 4 by increasing the intensity of the detection light from the first irradiation section 411. As a result of the adjustment, the first contrast CV1 is increased to values greater than or equal to the positive contrast threshold PCt in the area R11 on the operation surface SS and has values between the two thresholds PCt and NCt in the other area R12. Therefore, in the case where the first irradiation section 411 is used, in the area R11, the pointing element can be clearly recognized in a captured image. Further, the sum of the area R11, where the contrast CV1 obtained when the first irradiation section 411 emits light exceeds the threshold PCt, and the areas R22, where the contrast CV2 obtained when the second irradiation section 412 emits light exceeds the threshold NCt, encompasses the entire area of the operation surface SS. In other words, every position on the operation surface SS belongs to the area R11 or the area R22. In a case where the contrast CV1 and the contrast CV2 are obtained as described above, a pointing element (front end of pointing element, in particular) can be clearly distinguished from the operation surface SS and identified in an arbitrary position on the operation surface SS. In practice, the operation surface SS is slightly larger than the projected screen PS (FIG. 2B), which is the area where the projector 100 projects an image, in many cases. In this case, it is preferable that the sum of the area R11, where the contrast CV1 obtained when the first irradiation section 411 emits light exceeds the threshold PCt, and the area R22, where the contrast CV2 obtained when the second irradiation section 412 emits light exceeds the threshold NCt, encompasses at least the entire area of the projected screen PS.

In the example in FIG. 5, the intensity of the light emitted from the first irradiation section 411 is increased. Instead, the intensity of the light emitted from the second irradiation section 412 may be decreased. Instead, preferable contrast may be obtained in some cases by decreasing the intensity of the light emitted from the first irradiation section 411 or increasing the intensity of the light emitted from the second irradiation section 412. As will be understood from the above description, adjusting at least one of the two irradiation sections 411 and 412 allows the contrast between the pointing element and the operation surface SS to be adjusted to a value that exceeds the threshold PCt or NCt.

In a typical case, out of the two irradiation sections 411 and 412, increasing the intensity of the light emitted from the first irradiation section 411, which is closer to the operation surface SS, as compared with the intensity of the light emitted from the second irradiation section 412, which is farther away from the operation surface SS, allows preferable contrast values CV1 and CV2, such as those shown in FIG. 5. In view of the fact described above, the intensity of the light emitted from the first irradiation section 411, which is closer to the operation surface SS, may be so set experimentally or empirically to be sufficiently higher than the intensity of the light emitted from the second irradiation section 412, which is farther away from the operation surface SS, for preferable contrast. It is, however, noted that adjusting the intensities of the light fluxes emitted from the irradiation section 411 and 412 on the basis of contrast obtained by analysis of captured images captured with the imaging section 300 allows appropriate adjustment according to an actual installation environment, as described above.

The two irradiation sections 411 and 412 are preferably configured to emit light in a time division manner in such away that they emit light for different light emission periods that do not overlap with each other. In the case where the two irradiation sections 411 and 412 are configured to emit light in a time division manner, even when areas where the contrast values obtained in the different light emission periods are reversed in terms of sign of the contrast, positive or negative, are present on the operation surface SS, as shown in the example in FIG. 5, using images captured in the different light emission periods allows sufficient contrast to be readily obtained in each of the areas. It is, however, noted that the two irradiation sections 411 and 412 may instead be configured to emit light at the same time. Also in this case, it is preferable to obtain contrast that exceeds one of the thresholds in an arbitrary position on the operation surface SS by adjustment of the intensity of the light from at least one of the two irradiation sections 411 and 412.

The adjustment section 413 of the detection light irradiation section 410 may instead adjust the intensities of the light fluxes emitted from the irradiation sections 411 and 412 by using the environment in which the projector 100 is used and which is acquired by the use environment acquiring section 800 along with the contrast obtained by analysis of captured images captured by the imaging section 300. The light emission intensity adjustment using the use environment can be made, for example, as follows.

(a) Light Emission Intensity Adjustment Using Posture of Installed Projector 100

The posture sensor 810 can detect the posture of the installed projector 100 (horizontal or vertical posture). The posture of the installed projector 100 can affect the intensity of environmental light on the operation surface SS and hence possibly also greatly affects the contrast. In view of the fact described above, the adjustment section 413 may, for example, adjust the intensity of the light emitted from the first irradiation section 411 (or the ratio of the light emission intensity between the first irradiation section 411 and the second irradiation section 412) in such a way that the intensity (or the ratio) is higher in the case where the projector 100 is vertically postured than in the case where the projector 100 is horizontally postured. More preferable contrast can thus be obtained.

(b) Light Emission Intensity Adjustment Using Distance L Between Projector 100 and Operation Surface SS The distance measuring section 820 can measure the distance L (FIG. 2B) between the projector 100 and the operation surface SS. The adjustment section 413 may adjust, for more preferable contrast, the intensity of the light emitted from the first irradiation section 411 (or the ratio of the light emission intensity between the first irradiation section 411 and the second irradiation section 412) in such a way that the intensity (or the ratio) increases as the distance L increases. It is noted that the distance L between the projector 100 and the operation surface SS is equivalent to the size of the projected screen PS (that is, projection size).

(c) Light Emission Intensity Adjustment Using Brightness of Operation Surface SS Under Environmental Light The operation surface brightness measuring section 830 can measure the brightness of the operation surface SS in a state in which no light from the projection section 200 or the detection light irradiation section 410 is projected on the operation surface SS but only environmental light is present. The adjustment section 413 may adjust for more preferable contrast, the intensity of the light emitted from the first irradiation section 411 (or the ratio of the light emission intensity between the first irradiation section 411 and the second irradiation section 412) in such a way that the intensity (or the ratio) increases as the brightness on the operation surface SS in the state described above increases.

As for the contrast obtained from two captured images captured with the two cameras 310 and 320, the following two cases may occur: a case where the distributions of the contrast CV1 and the contrast CV2 have the same tendency; and a case where the distributions greatly differ from each other. In the latter case, the intensities of the light fluxes emitted from the two irradiation sections 411 and 412 are preferably so adjusted that a pointing element can be clearly recognized in an arbitrary position on the operation surface SS in two captured images captured with the two cameras 310 and 320.

As described above, in the embodiment described above, the adjustment section 413 adjusts the contrast between the pointing elements and the operation surface SS to a value that exceeds the threshold PCt or NCt by adjusting the intensity of the light emitted from at least one of the two irradiation sections 411 and 412. As a result, in an arbitrary position on the operation surface SS, each of the pointing elements (self-luminous pointing element 70 and non-luminous pointing element 80) can be clearly distinguished from the operation surface SS.

Variations:

The invention is not limited to the examples and embodiment described above and can be implemented in a variety of aspects to the extent that they do not depart from the substance of the invention. For example, the following variations are conceivable.

Variation 1:

The above embodiment has been described with reference to the case where the detection light irradiation section 410 includes the two irradiation sections 411 and 412, and the invention is also applicable to a position detection apparatus and a projector including only one irradiation section. Also in this case, the adjustment section 413 preferably adjusts the contrast between a pointing element and the operation surface SS to a value that exceeds one of the thresholds by adjusting the intensity of the light emitted from the one irradiation section. In single light emission operation of the one irradiation section, it is conceivable that the contrast cannot be adjusted to a value that exceeds one of the thresholds in an arbitrary position on the operation surface SS. In this case, it is preferable to cause the one irradiation section to emit light at light emission intensities different from one another for a plurality of light emission periods and use the plurality of captured images obtained by image capturing in the plurality of light emission periods to adjust the contrast to a value that exceeds the threshold in an arbitrary position on the operation surface SS. The adjustment described above is also applicable to a case where a plurality of irradiation sections are caused to go on the same timing.

Variation 2:

The above embodiment has been described with reference to an interactive projector that allows detection of the position pointed with a pointing element by using a stereoscopic camera method (triangulation), and the invention is also applicable to interactive projectors of other types. For example, the invention is also applicable to an interactive projector using an irradiation section (light curtain unit) that irradiates an object with layer-shaped detection light, such as the interactive projector described in above Variation 3:

The above embodiment has been described with reference to an interactive projector as an example of the position detection apparatus, and the invention is also applicable to other position detection apparatus other than an interactive projector. For example, the invention is also applicable to a digitizer and a tablet that allows a position on an operation surface to be pointed with a self-luminous pointing element.

The embodiment of the invention has been described on the basis of some examples. The embodiment of the invention described above is intended to facilitate understanding of the invention and is not intended to limit the invention. The invention can be changed and improved without departure from the substance of the invention and the claims, and equivalents of the invention, of course, fall within the scope of the invention.

What is claimed is:

1. A position detection apparatus that detects a pointed position pointed with a pointing element on an operation surface, the apparatus comprising:
a first irradiation section and a second irradiation section that irradiate the operation surface with detection light;
an imaging section that captures an image of the operation surface; and
at least one processor configured to detect the pointed position pointed with the pointing element based on a contrast between the pointing element and the projected screen in the captured image captured by the imaging section,
wherein
the first irradiation section is disposed in a position closer to the operation surface than the second irradiation section and emits light having intensity higher than intensity of the light emitted from the second irradiation section,
the first irradiation section and the second irradiation section emit the detection light in a time division manner, and
the imaging section performs the imaging in each of a period for which the first irradiation section emits light and a period for which the second irradiation section emits light.

2. A position detection apparatus that detects a pointed position pointed with a pointing element on an operation surface, the apparatus comprising:
a first irradiation section and a second irradiation section that irradiate the operation surface with detection light;
an imaging section that captures an image of the operation surface; and
at least one processor configured to:

detect the pointed position pointed with the pointing element based on the captured image captured by the imaging section;

acquire a use environment in which the position detection apparatus is used, and adjust the intensity of the light emitted from at least one of the first irradiation section and the second irradiation section, in accordance with the use environment in which the position detection apparatus is used, to adjust contrast between the pointing element and the operation surface in the captured image to a value that exceeds a threshold, wherein the use environment includes at least one of posture of the installed position detection apparatus, a distance between the position detection apparatus and the operation surface, and brightness of the operation surface under environmental light.

3. The position detection apparatus according to claim 2, wherein the first irradiation section is disposed in a position closer to the operation surface than the second irradiation section, and the at least one processor is further configured to adjust the intensity of the light emitted from the first irradiation section to a value higher than the intensity of the light emitted from the second irradiation section.

4. The position detection apparatus according to claim 1, wherein the intensity of the light emitted from each of the first irradiation section and the second irradiation section is so adjusted that a sum of a first area where first contrast obtained when the first irradiation section emits light exceeds a threshold and a second area where second contrast obtained when the second irradiation section emits light exceeds another threshold encompasses an entire area of the operation surface.

5. The position detection apparatus according to claim 1, further comprising a projection section that projects an image on the operation surface.

6. A contrast adjustment method used with a position detection apparatus that detects a pointed position pointed with a pointing element on an operation surface, the method comprising:

(a) irradiating the operation surface with detection light by using a first irradiation section and a second irradiation section;

(b) capturing an image of the operation surface;

(c) detecting the pointed position pointed with the pointing element based on the captured image captured in the step (b);

(d) acquiring a use environment in which the position detection apparatus is used, and (e) adjusting intensity of the light emitted from at least one of the first irradiation section and the second irradiation section, in accordance with the use environment in which the position detection apparatus is used, to adjust contrast between the pointing element and the operation surface in the captured image to a value that exceeds a threshold, wherein the use environment includes at least one of posture of the installed position detection apparatus, a distance between the position detection apparatus and the operation surface, and brightness of the operation surface under environmental light.

7. The position detection apparatus according to claim 1, wherein the first irradiation section is disposed in a position closer to the operation surface than the first imaging section, and the second irradiation section is disposed in a position farther from the operation surface than the first imaging section.

8. The position detection apparatus according to claim 1, further comprising:

a second imaging section that captures an image of the operation surface from a position different from the first imaging section, wherein the second imaging section is disposed in a position closer to the operation surface than the first imaging section and the second irradiation section.

9. The position detection apparatus according to claim 5, wherein the first irradiation section is disposed in a position closer to the operation surface than the projection section, and the second irradiation section is disposed in a position farther from the operation surface than the projection section.

10. A position detection apparatus that detects a pointed position pointed with a pointing element on an operation surface, the apparatus comprising:

a first irradiation section and a second irradiation section that irradiate the operation surface with detection light;

an imaging section that captures an image of the operation surface; and at least one processor configured to detect the pointed position pointed with the pointing element based on a contrast between the pointing element and the projected screen in the captured image captured by the imaging section, wherein the first irradiation section is disposed in a position closer to the operation surface than the second irradiation section and emits light having intensity higher than intensity of the light emitted from the second irradiation section, and the intensity of the light emitted from each of the first irradiation section and the second irradiation section is so adjusted that a sum of a first area where first contrast obtained when the first irradiation section emits light exceeds a threshold and a second area where second contrast obtained when the second irradiation section emits light exceeds another threshold encompasses an entire area of the operation surface.

* * * * *